United States Patent [19]

Edwards et al.

[11] 4,234,754
[45] Nov. 18, 1980

[54] OIL-FILLED ELECTRIC CABLE INSTALLATIONS COMPRISING PRESSURIZING OIL TANKS

[75] Inventors: Derek R. Edwards, Windsor; Cyril H. Gosling, Beckenham, both of England

[73] Assignee: BICC Limited, London, England

[21] Appl. No.: 14,727

[22] Filed: Feb. 23, 1979

[30] Foreign Application Priority Data

Feb. 28, 1978 [GB] United Kingdom ............... 7964/78

[51] Int. Cl.³ .............................................. H01B 9/06
[52] U.S. Cl. .................................. 174/14 R; 174/15 R
[58] Field of Search ............... 174/15 C, 15 R, 11 R, 174/12 R, 14 R

[56] References Cited

U.S. PATENT DOCUMENTS

| | | | |
|---|---|---|---|
| 1,872,245 | 8/1932 | Clark | 174/12 R |
| 1,923,147 | 8/1933 | Hirshfeld | 174/15 C |
| 2,274,388 | 2/1942 | Venable | 174/11 R |
| 2,501,305 | 3/1950 | Bennett | 174/11 R |
| 2,803,692 | 8/1957 | Richards et al. | 174/11 R |
| 2,985,706 | 5/1961 | Dobry | 174/15 R X |
| 3,083,257 | 3/1963 | Andrews et al. | 174/15 C X |
| 3,098,891 | 7/1963 | Delguste | 174/15 R |
| 3,608,710 | 9/1971 | Pugh | 174/15 C X |
| 3,894,171 | 7/1975 | Kusay | 174/15 R |

FOREIGN PATENT DOCUMENTS 371788 3/1932 United Kingdom .

OTHER PUBLICATIONS

Krupski, J., et al., *Hochdruck–Oelkabel im Stahlrohr fur380 KV,* Siemens Zeitschrift, vol. 48, #8, 8-74, pp. 568-575.
Paulin, D., et al., *Aspects Particuliers d'une Liaison en cables,* Revue Generale de l'Electricite, vol. 85, #4, 3-4-76, pp. 323-330.
Fallov, M. A. et al., *EHV Cables: Present Situation in France,* IEEE Trans. PAS, vol. PAS-86, #1, Jan. 67, pp. 81-90.

*Primary Examiner*—Arthur T. Grimley
*Attorney, Agent, or Firm*—Buell, Blenko & Ziesenheim

[57] ABSTRACT

An oil-filled electric cable installation, in which oil when flowing outwardly from the cable to a pressure-maintaining oil tank it passes through a percolating filter, preferably of an active material, to remove particulate and/or dissolved impurities. A one-way return passage bypasses the filter so that maintenance of pressure is not impaired, and if required a high-pressure bypass may be used to protect the filter from unusually high pressures.

4 Claims, 3 Drawing Figures

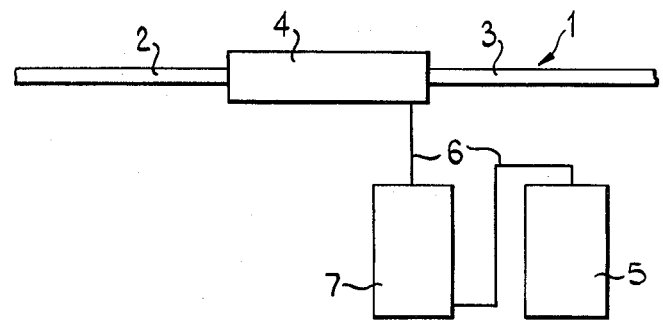
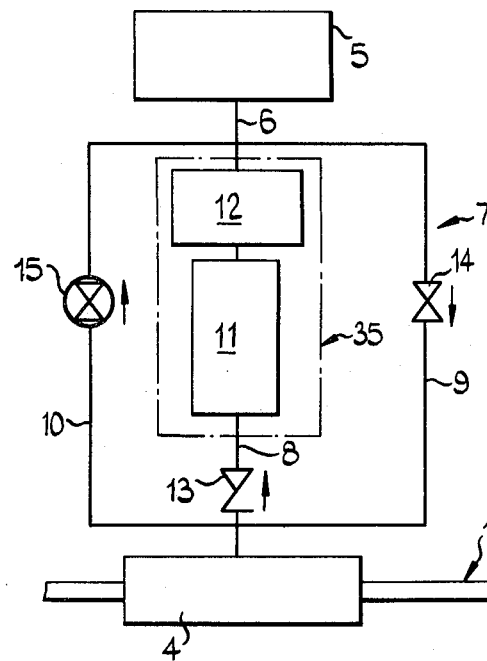

OIL-FILLED ELECTRIC CABLE INSTALLATIONS COMPRISING PRESSURIZING OIL TANKS

This invention relates to electric cable installations and more particularly to oil-filled power cable installations of the kind having a mobile liquid insulating impregnant ("oil") that is maintained under pressure.

Variations in the electrical load in such installations result in temperature variations and consequently in expansion and contraction of the oil. To limit resulting movements in the oil and to prevent the occurrence of excessively high pressures when substantial variations in height occur between different parts of the installation it is the practice to install at convenient intervals "stop joints" which provide a fluid-tight barrier dividing the installation into hydraulically-independent sections. Associated with at least one of the stop joints in a hydraulic section is at least one oil reservoir into which the oil can expand when the temperature of the installation rises and which supplies the oil necessary to maintain the required pressure and complete impregnation when the installation cools, and in some cases a similar reservoir may be connected to at least one "feed joint" within a hydraulic section to limit flow rates and pressure variations. For the sake of simplicity the expression "stop joints" will be used herein in a broad sense so as to include such feed joints and the fluid-tight sealing ends at which the cable is connected to electrical apparatus or to a different type of conductor.

Such stop joints are amongst the most sensitive parts of a cable installation, because they must provide passages for the flow of oil from conductor potential to the earth potential of the oil tank, whereas elsewhere in the installation the oil is either flowing in a space that is at a sensibly-uniform electrical potential (e.g. inside the load-carrying conductor) or else is present in the pores of paper (which greatly increases its electrical breakdown strength and minimises the risk of the presence of solid impurity particles in the oil). Contamination of the oil with very small quantities of degrading impurities (for example minute copper fibres or other particles derived from the cable conductors or sulphur compounds leached out from rubber sealing rings) which would have no significant effect on the rest of the installation, may therefore result in electrical breakdown in the oil passages and consequent explosive failure of the stop joint (which may cost tens of thousands of pounds sterling to repair in some installations, and in the meantime puts the installation out of service).

It is present practice to provide a wire gauze filter at each end of the oil passage in a stop joint (i.e. one at conductor potential and one at earth potential), but this has not proved sufficient to entirely eliminate the risk of failure.

In accordance with the invention, an oil-filled cable installation comprising cable sections defined by stop-joints to which are connected oil tanks for maintaining the cable sections filled with oil under pressure is characterised by the fact that an oil connection between a stop joint and an oil tank comprises two passages in parallel; that the first passage provides a percolating filter through which oil normally flows when passing from the cable to the tank; and that the second passage contains a one-way valve permitting flow of oil from the tank to limit the extent to which the oil pressure in the cable can fall below that in the tank.

Preferably the first passage also includes a non-return valve to prevent any substantial flow of oil through the filter in the reverse direction.

Preferably there is a third passage, in parallel with the first and second passages, which contains a pressure-relief valve permitting oil to bypass the percolating filter in order to limite the oil pressure in the cable.

By a "percolating" filter is meant a filter of substantial thickness and cross sectional area made up of a column or a bed of particles or a plurality of sheets of fibrous material, through the pores of which the oil must percolate to pass from one side of the filter to the other and which will remove at least one kind of impurity from the oil by physical entrapment, chemical adsorption or other mechanism.

The filter could, for example, be made of a plurality of paper layers that will trap particulate impurities only, but we much prefer to use a filter that consists of or incorporates an active material that will selectively adsorb and remove impurities from solution in the oil; such active material may be in small enough particles to trap particulate material also. Suitable active materials include; Attapulgus Earth and other refining earths; activated alumina; molecular sieve granules; ceramic granules; and activated charcoal. All of these can be used in column or bed form and most if desired as loading in a multi-layer paper filter (either within some or all the paper layers or sandwiched between them or both). Activated charcoal may in some circumstances absorb gaseous products of decomposition that may be generated and introduced into the oil by electrical discharges.

If the filter incorporates a column or bed of particles, it may also include in particular a fibrous sheet component adjacent to or spaced from at least one of the ends of the column or bed. When the column or bed is made up of small particles, this serves to trap fine particles that might otherwise escape from the column or bed; and it may be desirable, especially if there are many fine particles, for such a fibrous sheet component to have a larger cross-section than the bed or column. When the column or bed is of relatively large particles, the fibrous filter or filters serves to trap impurity particles that may be fine enough to pass through the pores of the column or bed. When the filter comprises a column or bed of particles the oil preferably flows through it in an upward direction. Another filter material that is useful by itself or in combination with a column or bed is paper loaded with activated alumina or other active substance, preferably in accordance with British Pat. No. 874,981 though it is possible to use active substances having a larger particle size than the maximum of 0.5 micrometres therein specified.

In use oil will flow outwards from the cable to the tank through the percolating filter, thereby freeing the oil of particulate and possibly ionic and other impurities, when the temperature of the cable is rising, except in installations with the third passage, in which case when the temperature rises so rapidly that excessive pressures would arise, risking damage to the cable and/or the filter, the pressure-relief valve opens and allows oil to flow directly from the cable to the tank through the third passage. When the cable cools, oil flows from the tank to the cable through the second passage and the one-way valve, which preferably opens at a very low back-pressure so that the tank pressure need not be significantly higher than in a conventional installation.

Thus impurities are being removed from the oil for a significant fraction of the time while the installation is in service and the tendency to accumulate particulate impurities in the stop joint is substantially reduced. Further security can be achieved, if required, by artificially imposing an oscillating (or in some circumstances a unidirectional) flow either while the cable installation is idle or when it is under load.

Preferably the percolating filter can be discarded and replaced after a period of service.

In the drawings

FIG. 1 is a block diagram of an oil-filled cable installation in accordance with the invention;

FIG. 2 is a circuit diagram of part of the installation; and

Figure 3:
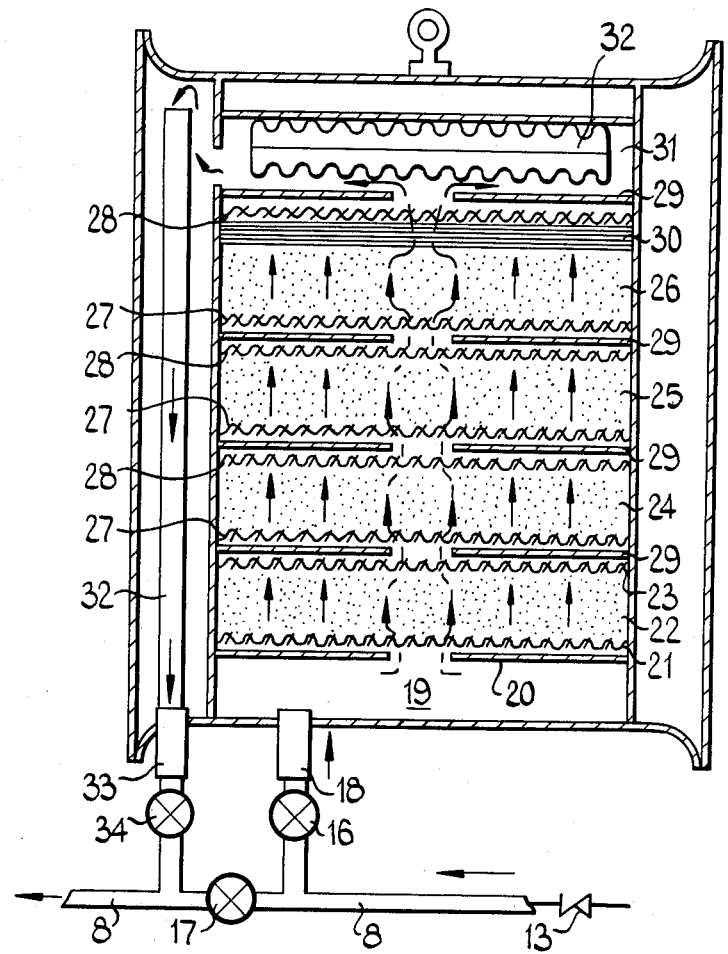
FIG. 3 is a partly-diagrammatic vertical section through a percolating filter forming part of the installation.

As seen in FIG. 1, the installation comprises at least one oil-filled cable 1 made up of hydraulically-independent sections 2, 3 connected electrically and insulates hydraulically by a stop-joint 4. To maintain an adequate and sufficiently uniform pressure (say about 0.5 $MN/m^2$) of oil in the cable during variations in loading, ambient temperature, etc. a pressurised oil tank 5 is connected to the stop-joint by a duct 6 in which is interposed, in accordance with the invention, an oil-treatment unit 7.

This unit (FIG. 2) comprises passages 8, 9 and 10 in parallel: the first passage 8 provides a percolating filter made up of a column 11 of active particulate material and a fibrous filter 12, and is controlled by a non-return valve 13; the second passage 9 bypasses the percolating filter and is controlled by a low-pressure return valve 14; and the third passage 10 also bypasses the percolating filter and is controlled by a high-pressure bypass valve 15.

When the oil-pressure in the cable tends to rise, usually because its temperature is rising, oil ordinarily flows to the oil tank through the passage 8 and so through the percolating filter, which reduces the level of impurities in it. As soon as the flow tends to reverse, the non-return valve 13 closes and the pressure across the valve 14 rapidly rises to the small value (preferably not higher than 0.015 $MN/m^2$) needed to open it, whereupon oil flows from the tank 5 to the cable 1 without being subjected to the impedance of the percolating filter, so that its provision cannot appreciably reduce the pressure at which the cable is maintained.

In case of a rapid rise in cable pressure, for example due to a sustained electrical overload, the high-pressure valve 15 opens and oil flows through the passage 10 to avoid disruptive pressures in the filter. The appropriate opening pressure for this high-pressure valve 15 may vary considerably, depending on the design of the percolating filter, but it will usually be in or around the range 0.015 to 0.5 $MN/m^2$.

FIG. 3 shows one practical form of percolating filter. Oil flowing in passage 8 away from the non-return valve 13 passes through a normally-open manual valve 16 (manual valve 17, whose purpose will be explained later, is normally closed) and coupling 18 into a chamber 19 at the base of the filter. Flowing through the central opening of a baffle ring 20, it passes through a porous support 21 and percolates upwards through a bed 22 of active particulate material, and out through a porous cover plate 23. Three similar beds 24, 25 and 26 follow in series, each with a porous support 27 and a porous cover plate 28 and with further baffle plates 29 interposed between them and above the last of them (26). Between the top of the last bed 26 and its cover plate is interposed a multilayer paper filter 30.

The subdivision of the active particles into several beds and the baffle plates between them help to ensure even distribution of the flowing oil and reduce channelling in the beds.

Above the last of the baffle plates 29 is a chamber 31 containing a pressurised flexible cell 32 which serves to damp out any pulsations in fluid flow that might otherwise tend to disturb the particles of the beds. From the chamber 31 the oil flows through a return duct 32, a coupling 33 and another normally-open manual valve 34 to the oil tank.

By first opening the valve 17 and then closing valves 16 and 34, the couplings 18 and 33 can be released and the filter unit 35 removed for servicing or replacement without taking the cable installation out of service.

EXAMPLE

In a specific installation of the kind shown in the drawings, the filter unit 35 is cylindrical, 0.5 m in diameter and 2 m high. The beds are formed of active Attapulgus earth with particle sizes such that it passes through a no. 30 (and preferably also a no. 50) U.S. standard wire mesh but is substantially entirely retained by a no. 80 mesh. The average flow rate through the filter is 0.2 l/min and the maximum 3.5 l/min. The return valve 14 is set to open at a pressure of about 0.015 $MN/m^2$ and the bypass valve 15 at a pressure of about 0.02 $MN/m^2$.

Other specifice materials suitable for the bed include molecular sieve beads and the active silica beads sold under the trademark Porosil, with particle sizes in the range 1–2 mm in each case. In these cases the impedance to flow is much lower, and the high-pressure bypass passage 10 may be un-necessary.

The invention improves the reliability of electric power distribution systems.

We claim:

1. An oil-filled electric cable installation comprising (i) at least one cable comprising at least one metallic conductor, insulation surrounding the conductor, an enclosing fluid-tight sheath and at least one oil duct extending from end to end of the cable inside the sheath, the cable comprising a plurality of sections defined by stop-joints (ii) oil tanks for maintaining the cable sections filled with oil under pressure and (iii) oil ducts connecting said oil tanks to the stop-joints wherein: at least one said oil duct comprises two passages in parallel; the first passage provides a percolating filter through which oil normally flows when passing from the cable to the tank; and the second passage contains a one-way valve permitting flow of oil from the tank to limit the extent to which the oil pressure in the cable can fall below that in the tank.

2. An installation as claimed in claim 1 wherein in that the first passage also includes a non-return valve to prevent any substantial flow of oil through the filter in the reverse direction.

3. An installation as claimed in claim 1 or claim 2 wherein there is a third passage in parallel with the first and second passages and containing a pressure-relief valve permitting oil to bypass the percolating filter.

4. An installation as claimed in claim 1 or claim 2 wherein the percolating filter comprises an active material that will selectively adsorb and remove impurities from solution in the oil.

* * * * *